United States Patent
Chithambaram et al.

(10) Patent No.: US 6,963,748 B2
(45) Date of Patent: Nov. 8, 2005

(54) MOBILE DEVICE LOCATOR ADAPTER SYSTEM FOR LOCATION BASED SERVICES

(75) Inventors: Nemmara Chithambaram, Novato, CA (US); John Ricardo Deaguiar, Sebastopol, CA (US)

(73) Assignee: Autodesk, Inc., San Rafael, CA (US)

( * ) Notice: Subject to any disclaimer, the term of this patent is extended or adjusted under 35 U.S.C. 154(b) by 347 days.

(21) Appl. No.: 10/037,805

(22) Filed: Dec. 26, 2001

(65) Prior Publication Data

US 2003/0126264 A1 Jul. 3, 2003

(51) Int. Cl.[7] .................................................. H04Q 7/20
(52) U.S. Cl. .............................. 455/456.1; 455/456.2; 455/456.3; 455/458
(58) Field of Search ........................... 455/456.1, 456.2, 455/456.3, 456.5, 456.6, 458; 701/213, 214, 215, 201

(56) References Cited

U.S. PATENT DOCUMENTS

| | | |
|---|---|---|
| 5,790,800 A | 8/1998 | Gauvin et al. |
| 5,842,130 A * | 11/1998 | Oprescu-Surcobe et al. .............. 455/456.2 |
| 5,978,672 A | 11/1999 | Hartmaier et al. |
| 6,115,754 A | 9/2000 | Landgren |
| 6,199,045 B1 * | 3/2001 | Giniger et al. .............. 705/1 |
| 6,236,365 B1 | 5/2001 | LeBlanc et al. |
| 6,243,709 B1 | 6/2001 | Tung |
| 6,295,502 B1 | 9/2001 | Hancock et al. |
| 6,757,544 B2 * | 6/2004 | Rangarajan et al. ...... 455/456.1 |
| 2002/0107029 A1 * | 8/2002 | Caughran et al. ........... 455/456 |
| 2004/0077359 A1 * | 4/2004 | Bernas et al. ............ 455/456.1 |
| 2004/0110515 A1 * | 6/2004 | Blumberg et al. ....... 455/456.1 |

* cited by examiner

Primary Examiner—Temica M. Beamer
(74) Attorney, Agent, or Firm—Gates & Cooper LLP (57) ABSTRACT

One or more embodiments of the invention provide a method, apparatus, and article of manufacture for locating a mobile device. An application programming interface (API), executed by a computer, provides a plurality of simplified procedures that allow an application program executed by the computer to locate the mobile device. The application program invokes the simplified procedures of the API. The invoked procedures obtain a location of the mobile device given an identification of the mobile device and a description of a spatial reference system associated with the location. Additionally, the invoked procedures interact with specifics for a mobile positioning server of a carrier of the mobile device and with different methods of identifying the device as required by the carrier.

33 Claims, 4 Drawing Sheets

$\theta_1$ Starting angle
$\theta_2$ Ending angle
$d_1$ Inner radius
$d_2$ Outer radius Cell tower

FIG. 4

MOBILE DEVICE LOCATOR ADAPTER SYSTEM FOR LOCATION BASED SERVICES

CROSS-REFERENCE TO RELATED APPLICATIONS

This application is related to the following co-pending and commonly-assigned patent applications, which applications are incorporated by reference herein:

U.S. patent application Ser. No. 10/034,440, entitled "LOCATION BASED SERVICES BRIDGE TO EXTERNAL DATA SOURCES", by Nenimara Chithambaram, et. al., filed on the same date herewith;

U.S. patent application Ser. No. 10/034,442, entitled "FUZZY LOGIC REASONING FOR INFERRING USER LOCATION PREFERENCES", by Nemmara Chithambaram, filed on the same date herewith;

U.S. patent application Ser. No. 09/629,115, entitled "METHOD AND APPARATUS FOR PROVIDING ACCESS TO MAPS ON A PERSONAL DIGITAL ASSISTANT (PDA)", by Nemmara Chithambaram et al., filed on Jul. 31, 2000;

U.S. patent application Ser. No. 09/628,851, entitled "GEOGRAPHICAL DATA MARKUP ON A PERSONAL DIGITAL ASSISTANT (PDA)", by Edward J. Connor, et al., filed on Jul. 31, 2000;

U.S. patent application Ser. No. 09/628,850, entitled "GENERALIZED, DIFFERENTIALLY ENCODED, INDEXED RASTER VECTOR DATA AND SCHEMA FOR MAPS ON A PERSONAL DIGITAL ASSISTANT", by Nemmara Chithambaram et al., filed on Jul. 31, 2000;

U.S. application Ser. No. 09/795,719, entitled "INTER-PROCESS APPLICATION PROGRAMMING INTERFACE FOR PERSONAL DIGITAL ASSISTANT APPLICATIONS," filed on Feb. 28, 2001, by Timothy John Nelson, et. al., U.S. application Ser. No. 09/795,890, entitled "SINGLE GESTURE MAP NAVIGATION GRAPHICAL USER INTERFACE FOR A PERSONAL DIGITAL ASSISTANT," filed on Sep. 5, 2001, by Nemmara Chithambaram, et. al., U.S. patent application Ser. No. 09/629,117, entitled "METHOD AND APPARATUS FOR OBTAINING A SET OF MAPS", by Howard Marantz et al., filed on Jul. 31, 2000; and Patent Cooperation Treaty application serial number PCT/US00/26436, entitled "GEOGRAPHIC MAPS ON A PERSONAL DIGITAL ASSISTANT (PDA) AND SERVER," filed on Sep. 26, 2000, by Nemmara Chithambaram, et. al., U.S. patent application Ser. No. 09/411,506, entitled "VECTOR-BASED GEOGRAPHIC DATA", by Gregory A. Roy, et. al., filed on Oct. 4, 1999, which is a continuation patent application of U.S. Pat. No. 5,966,135 issued on Oct. 12, 1999 (application Ser. No. 08/757,706 filed on Oct. 30, 1996), by Gregory A. Roy et al., entitled "VECTOR-BASED GEOGRAPHIC DATA".

BACKGROUND OF THE INVENTION

1. Field of the Invention

The present invention relates generally to location based services, and in particular, to a method, apparatus, and article of manufacture for detecting the location of a mobile device.

2. Description of the Related Art

Detecting the location of a mobile device (e.g., a cellular phone, a personal digital assistant [PDA], etc.) is fundamental to providing location based services (LBS). Location based services are applications/services that utilize or are based on the location of a device. For example, detecting that a device is located on a particular street (e.g., McInnis Parkway) allows an LBS application to provide a nearby theatre (e.g., Northgate Mall Cinema) when a user requests the closest entertainment option. Additional examples of LBS applications include traffic updates, location sensitive billing, fleet management, and asset and people tracking. However, different protocols may be used by different cellular phone carriers to provide location information. Accordingly, in the prior art, LBS applications must be individually configured for each cellular phone carrier to provide location information. Such configuration customization is time consuming, subject to continuous and multiple modifications/updates, and burdensome for LBS providers.

Location Detection Prior Art

As described above, a wide variety of methods/protocols are used by mobile device carriers to determine and provide a device's location to an LBS application. For example, different methods may be used to identify the device. Further, different protocols may be used to communicate with the carrier's mobile positioning server (MPS). Different formats for request/response exchange with the mobile positioning server may also be used. Additionally, there may be different levels of robustness, error handling, and network infrastructure stability. Lastly, there may be differing levels of precision/accuracy in the location provided by the MPS (e.g., the approximate location provided by the MPS could be 150 meters to several 100 meters from the actual location of the device). Thus, while some MPS services only provide a geographic region that a mobile device is within, other MPS services may provide specific coordinates.

The use of such varying methodologies are problematic for LBS providers. The focus of most LBS providers is in the application/business logic that utilizes the location of the device. However, for an application to be utilized in a variety of environments and platforms, substantial time and programming is necessary to customize the application for each cellular provider.

SUMMARY OF THE INVENTION

One or more embodiments of the invention provide a method, system, apparatus, and article of manufacture for determining the location of a device using a variety of mobile device carriers. A device locator (also referred to as a device locator adapter) provides a common uniform application programming interface (API) for a user.

The API isolates and allows application developers to ignore specifics of a mobile device carrier when locating a device. The device locator interacts with the specifics of a carrier's positioning server and the different methods of identifying the device as required by the carrier (e.g., cell phone number, a mobile subscriber international subscriber directory number [MSISDN] encoded in a "cookie" in a wireless application request, IP address encoded in the request header, or a pre-stored default in a user profile database). Further, the device locator deals with difference in protocols of the carrier (e.g., HTTP, HTTPS, etc.). The device locator provides robustness by dealing with network instabilities within a carrier's infrastructure.

Once a device's approximate location is determined through the API, the approximate location may be refined by a mobile positioning server by applying one or more heuristics. For example, the approximate location may be snapped to the closest point on a street network or snapped to a landmark or "point of interest" in the vicinity.

Alternatively, the refinement may look for locations in the vicinity of the approximate location, that the mobile device user has recently visited (e.g., by studying the "history" in a user's profile). Further, the approximate location may be refined by examining "favorite" locations bookmarked by the mobile device user, and determining if any "favorite" locations are in the vicinity of the approximate device location.

Additionally, to utilize new carriers or to modify existing carriers in the system, a new adapter is merely added. The API remains the same from the application developer's view and a new version of the entire system does not need to be deployed. Thus, new adapters may be dynamically deployed and used in the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and in which is shown, by way of illustration, several embodiments of the present invention. It is understood that other embodiments may be utilized and structural changes may be made without departing from the scope of the present invention.

Overview

An API allows location based service applications to determine the location of a device regardless of the mobile device carrier. Specifics of the carrier's positioning server, mobile device identification method, and protocol are handled internally by the methods of the API. Accordingly, the application is insulated and the specific details of a carrier are transparent. Further, using heuristics, a device's approximate location may be refined.

Hardware Environment

Figure 1:
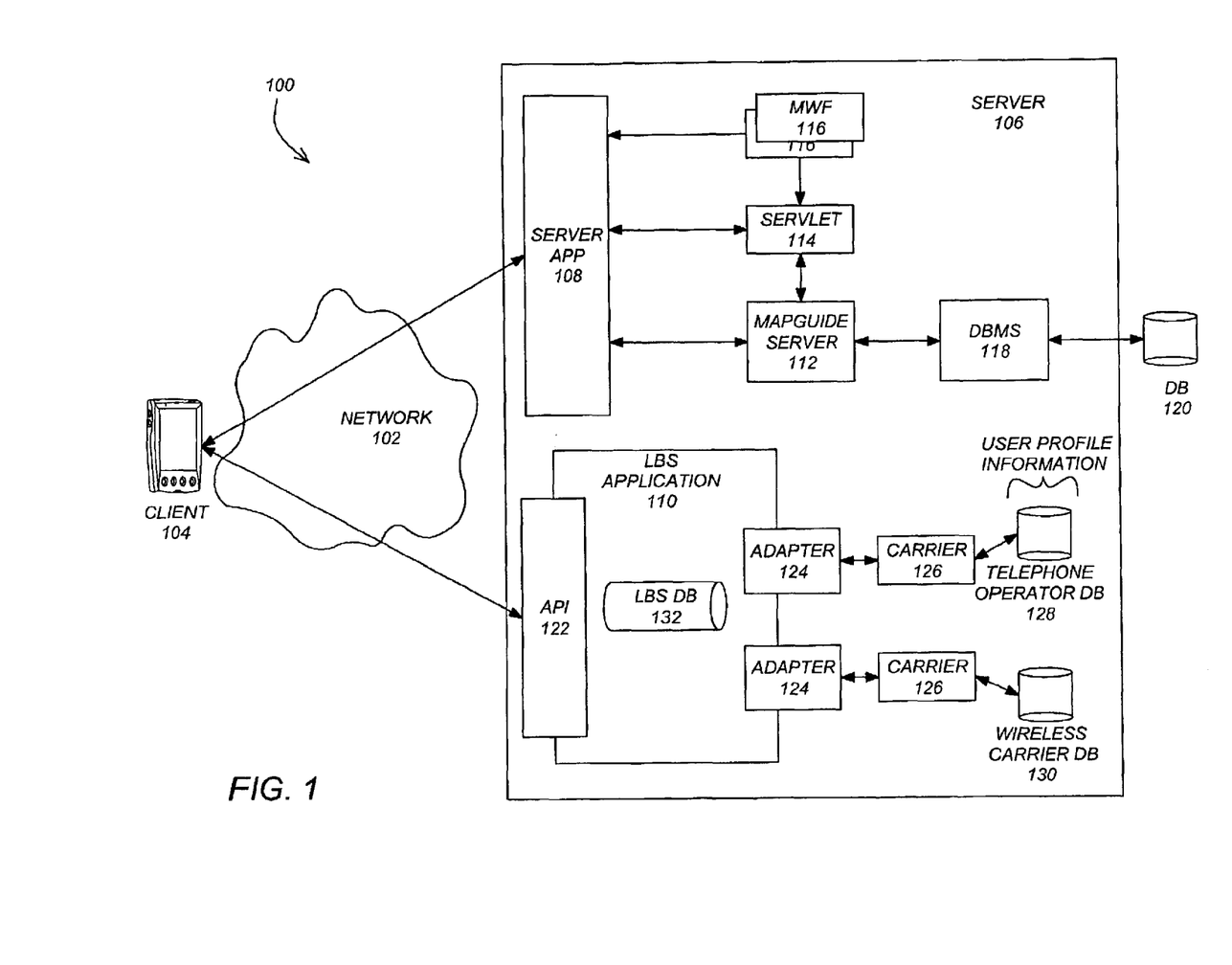
FIG. 1 schematically illustrates a hardware and software environment utilized in accordance with one or more embodiments of the invention.

FIG. 1 schematically illustrates a hardware and software environment utilized in accordance with one or more embodiments of the invention. A typical distributed computer system 100 uses a network 102 (such as the Internet) to connect technicians utilizing mobile device clients 104 (e.g. a cellular phone, PDA, WINCE, or PALM device) or desktop clients (e.g., a computer system running a browser) to server computers 106.

A mobile device client 104 may include any type of mobile device such as handheld personal computers (HPC), palm-held personal computers (PPC or PDA), cellular phones, smart phones, etc. However, embodiments of the invention may be implemented on desktop clients as well. Hereafter, mobile device clients 104 and desktop clients may be used interchangeably and refer to all types of clients/client computer systems. A typical combination of resources used in system 100 may include a network 102 such as a cell phone network, the Internet, LANs, WANs, or the like, mobile devices 104, desktop clients, and servers 106 that are personal computers, workstations, minicomputers, or mainframes.

The network 102 connects mobile device clients 104 or desktop clients executing the appropriate software applications to server computers 106. Server computers 106 may execute a variety of applications including a server application 108 (e.g., a Web server), an LBS application 110, MapGuide server 112, and/or servlet 114. MapGuide servers 112 and servlets 114 may be located within or part of server application 108. The server 106 and its components may also be referred to as a back office system. Such a back office system maintains access to corporate databases, synchronization utilities, etc. The server application 108 is typically a program such as a UNIX Apache Web server or Microsoft's Internet Information Server. The servlet 114 may communicate with a client 104 through server application 108 such that any additional processing required by a client 104 may be performed by the servlet 114.

In a geographic information system (GIS) offering location based services, servlet 114 may communicate with MapGuide server 112 to obtain needed map data/information. Additionally, servlet 114 may access map windows files (MWF) 116 to obtain relevant data. MapGuide server 112 (or another application) may also interact with a database management system (DBMS) 118 that may be utilized to retrieve relevant geographical data (such as SDF [Spatial Data Files] data [a special data format for delivering large amounts of data quickly over an intranet or the Internet], raster data, Open DataBase Connectivity (ODBC) data, etc.) from database 120.

Further, client 104 may interface with LBS application 110 through an application programming interface (API) 122 that provides a uniform interface for determining a location of device 104 and providing additional location based services. To determine the location of client device 104, the LBS application may utilize one or more adapters 124 for each of the different protocols of various mobile device carriers 126. The carriers 126 may also maintain user profile information in one or more databases 128–130. The LBS application 110 may also maintain an LBS database 132 for the local storage of information.

Generally, components 104–132 all comprise logic and/or data that is embodied in or retrievable from a device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Mobile Device Locator Adapter System

A device locator application may be executing on a client 104 or a server 106 to determine the location of a specific mobile device client 104. To determine the location of a mobile device client 104, a device-specific identification is provided to the device locator. For example, a mobile subscriber international subscriber directory number (MSISDN) (the directory number [e.g., the GSM—global system for mobile communications number] or the number one dials to connect to a GSM subscriber) may be provided to a device locator application 110. Such an MSISDN may be encoded in a cookie in a wireless application request. Alternatively, a device may be identified by an Internet protocol (IP) address encoded in a request header or may be identified by a pre-stored default in the user profile database 128–130.

The resulting location provided by the device locator 110 contains the coordinates of the device 104, the device's 104 spatial reference system (SRS), and information regarding the precision of the coordinates.

The device locator 110 provides an interface 122 for accessing the network-provided location of a device 104. For devices 104 that provide their own location (such as via a SIM card), the application developer already has the coordinates of the device 104 and does not need to use the device locator 110.

The device locator 110 provides users with a unified API 122 for determining the location of devices 104. The device locator 110 retrieves the location of devices 104 from third-party location determination technology (LDT) providers 126, each of which may support different protocols (e.g., HTTP, HTTPS, etc.). LDT is a general term that describes a carrier network based service that provides device 104 location information to internal and external systems. LDT adapters 124 may be supplied by specific carriers 126 and may be utilized to provide the location information. Any location obtained from a source other than the supplied LDT adapters 124 may still be used throughout GIS applications in any application programming information (API) call that requires a location parameter. As described above, LDT providers/carriers 126 may each support different protocols that may vary with respect to the format of the request, the format of the response, and the accuracy of the response. Some services may only provide a geographic region that the mobile system is within, while others may provide specific coordinates.

The device locator interface (i.e., the API) 122 insulates application code from the specific APIs of individual LDT providers 126. Application developers do not need to understand provider APIs or protocols. Instead, an LDT adapter 124 translates specific provider APIs into a generic API 122 that is presented to the application as the device locator 110. The LDT adapter 124 therefore insulates the application from differences in protocols like hypertext transfer protocol (HTTP), secure hypertext transfer protocol (HTTPS), etc. Such an architecture may also support additional LDT providers 126 in the future without changing the application API 122. An LDT adapter 124 simply needs to be written for the new LDT provider 126.

Figure 2:
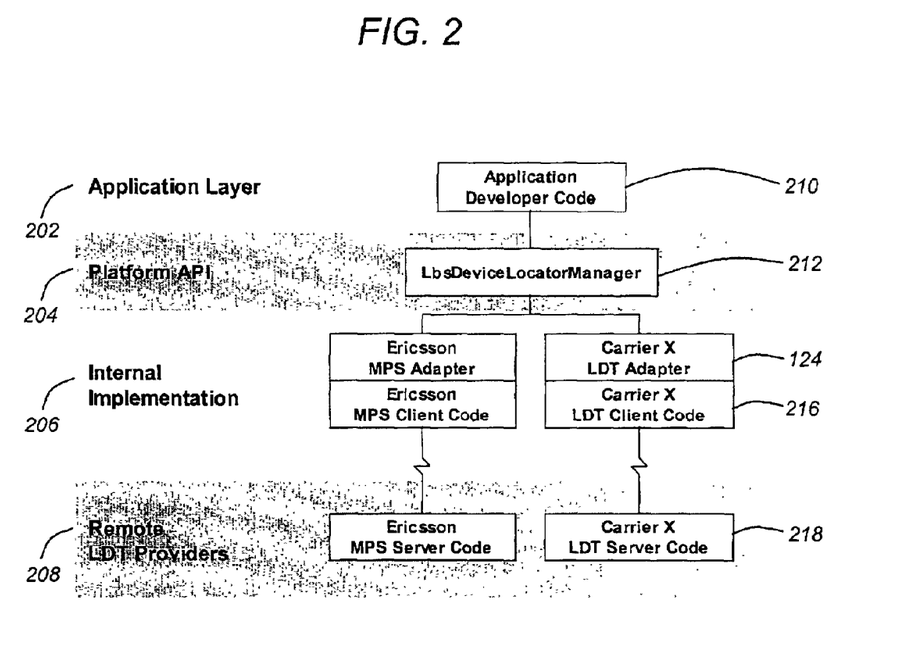
FIG. 2 illustrates a simple representation of an architecture that supports a device locator in accordance with one or more embodiments of the invention.

FIG. 2 illustrates a simple representation of an architecture that supports a device locator 110 in accordance with one or more embodiments of the invention. As illustrated, the architecture has several layers 202–208. Application code 210 in application layer 202 interfaces through the uniform API 122 with a device locator 212 (e.g., LbsDeviceLocatorManager) in the platform API layer 204 to obtain location information for a device 104.

The device locator 212 interfaces with individual carrier protocols set forth in specific carrier LDT adapters 124 in internal layer 206 to retrieve location information using carrier specific implementations. The carrier LDT adapters 124 interact with client code 216 that communicates with server code 218 in the remote LDT provider layer 208.

To query the location of a device 104, the application code 210 retrieves an instance of a device locator object 212 (e.g., LbsDeviceLocatorManager). The application code 210 may then use the device locator 212 to obtain the location of a device 104 given a device's id. As described above, the format of device ids may vary according to the LDT implementation. If a query for the location of a device 104 fails, the device locator 212 may generate an exception.

If the query is successful, a location object may be returned to application layer 202. As described above, the resulting location object may contain a Point/Coordinate object containing the coordinates representing the device's location, an SRS object that describes the associated spatial reference system, and a Precision object that describes the precision of the coordinates.

In one or more embodiments of the invention, a device locator manager provides the API 122 and delegates calls to specific getlocation( ) methods implemented for/by individual carriers 126. To ensure that the individual carriers 126 implement such a getLocation method, an interface (e.g., a devicelocator interface) may be implemented by all specific device locator adapters 124.

Ericsson™ Implementation

As described above, various adapters 124 may be utilized by the LBS application 110. Each adapter 124 may be configured for a particular cellular carrier 126. The following description is specific for supporting an implementation for an adapter 124 implemented for Ericsson™. For the Ericsson™ implementation, the device id is represented as an MSISDN.

Figure 3:
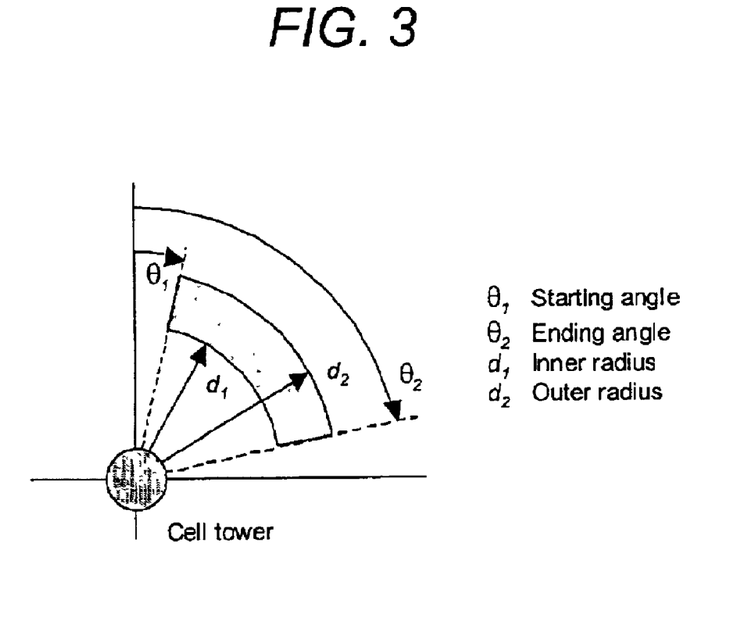
FIG. 3 illustrates the modeling of location data as an arc in accordance with one or more embodiments of the invention.

The Ericsson™ implementation locates the device 104 within a cell and can determine its approximate distance from the cell tower. A cell is a geographic area surrounding or immediately adjacent to a base station. This location data may be modeled as an arc as shown in FIG. 3. The Point object returned (e.g., as part of the location object) represents the geometric center of the arc, and the application layer 202 may retrieve the inner and outer radii d1 and d2. Further, angles $\theta_1$ and $\theta_2$ are in degrees and are measured clockwise from due North.

If the device locator 212 fails to determine the location of a device 104, it will retry the request a predetermined/specified number of times. If, after the specified number of retries, the device locator 212 still fails to determine the location, an exception is thrown. Typically, exceptions occur when interfacing with the LDT provider 126/adapter 124. If the LDT provider 126 generates the exception, then any additional information provided by the provider 126, such as error codes and messages, may be written to an error log file.

One can determine that an exception was thrown by the device locator 212 by comparing its error code to a list of error codes. The following tables describe the error codes returned by an Ericsson™ implementation, that will appear in an error log file. In the tables, the term coordinate system refers to a system for specifying a location. The Ericsson™ Mobile Positioning Protocol (Ericsson™ MPP) refers to an HTTP/HTTPS-based specification developed by Ericsson for interfacing with a mobile positioning center. IDMS0 refers to a format for specifying latitude or longitude, where I is a letter indicating the cardinal direction, D is degrees (2 or 3 digits), M is minutes (2 digits), S is seconds (2 digits), and 0 indicates no decimals (e.g., E153806 or N603758). Additionally, Mobile Positioning Centre (MPC) is the term employed by Ericsson™ to describe a positioning gateway that enables applications to access mobile station position information. Further, Mobile Positioning System (MPS) is the term employed by Ericsson™ to describe the implementation of their MPP for LDT. The error codes represent version 3.0 of the Ericsson™ MPS SDK.

TABLE 1

Ericsson ™ General Error Codes

| Error Code | Description |
| --- | --- |
| 0 | No error. |
| 200–299 | Syntax error. |
| 300–399 | Authentication error. |
| 400–499 | Authorization error. |
| 500–599 | Positioning error. |
| 600–699 | Network error. |
| 9999 | Internal MPC error. |

TABLE 2

Ericsson ™ Syntax Error Codes

| Error code | Description |
| --- | --- |
| 200–299 | Syntax error. Syntax error is always described with a text slogan. |

TABLE 3

Ericsson ™ Authentication Error Codes

| Error Code | Description |
| --- | --- |
| 300 | Access denied. Invalid Password or Client Id or the LCS client is not activated. |
| 399 | Authentication error, other. |

TABLE 4

Ericsson ™ Authority Error Codes

| Error Code | Description |
| --- | --- |
| 400 | Request type not allowed for client. |
| 401 | MSISDN specified in the request not allowed to be positioned by the client. |
| 499 | Authority error, other. |

TABLE 5

Ericsson ™ Positioning Error Codes

| Error Code | Description |
| --- | --- |
| 503 | Congestion. It is not possible to execute the positioning request at the requested time or times due to heavy usage of the MPC. |
| 504 | Conversion to correct geodetic datum failed. |
| 505 | Positioning of the MS failed, probably due to missing cell data. |
| 506 | Positioning of the specified MSISDN is not allowed at the moment. |
| 599 | Positioning error, other. |

TABLE 6

Ericsson ™ Network Error Codes

| Error Code | Description |
| --- | --- |
| 600 | The specified MSISDN in not known to the network. |
| 601 | The specified MSISDN is not available for positioning. This occurs for example if the MS is detached. |
| 602 | The specified MSISDN is not reachable for positioning at the moment. This occurs for example if the MS out of radio coverage. |
| 603 | Positing failed due to network reasons. |
| 699 | Network error, other. |

TABLE 7

Ericsson ™ MPS 1.1 Error Codes

| Error Code | Description |
| --- | --- |
| 0 | No error. |
| 100 | No parameters were supplied with the request. |
| 101 | The POSITION_TIME parameter is missing in the request. |
| 102 | The POSITION_TIME parameter is missing in the request. |
| 107 | Access denied. The user does not exist or the supplied password is incorrect. |
| 110 | The parameter GEODETIC_DATUM was specified in the request but was not assigned any value. |
| 111 | The parameter COORDINATE_SYSTEM was specified in the request but was not assigned any value. |
| 112 | The parameter POSITION_FORMAT was specified in the request but was not assigned any value. |
| 113 | The parameter GMT_DIFFERENCE was specified in the request but was not assigned any value. |
| 114 | The parameter POSITION_DELAY was specified in the request but was not assigned any value or the assigned value was not a numeric string. |
| 1001 | Access denied. The specified request is not authorized to execute. |
| 1002 | Invalid syntax for the supplied POSITION_ITEM value. This can also indicate that too many position items have been specified. |
| 1003 | Invalid syntax for the supplied POSITION_TIME value. This can also indicate that too many position times have been specified. |
| 1004 | The supplied request will generate too many positions and has thus been rejected. |
| 1005 | The MPC has problems contacting the network. |
| 1006 | The PP the MPC uses for the request has an internal error, due to this the MPC cannot execute the request. The MPC may be missing cell data in its internal cell database. |
| 1007 | The specified MS is not available for positioning. This occurs for example if the MS is detached. |
| 1008 | The request has passed its specified positioning time. This can be due to heavy load on the MPC and due to POSITION_DELAY being set to a too small value. |
| 1009 | The network claims that there is an error in the MS. |
| 1010 | Congestion. The MPC is unable to execute the positioning request at the requested time or times due to currently heavy usage of the MPC. This can be overcome by increasing the allowed positioning delay value (see Available MPP parameters on page 4). |
| 9999 | The request cannot be executed due to an internal error in the MPC. |

Location Refinement

Once a location for a device 104 has been obtained, one or more embodiments of the invention may refine the approximate location by applying several heuristics. A user or application may specify when such a location refinement is to occur. For example, a boolean "REFINE" value may be set to TRUE if refinement is desired. Accordingly, once a location is identified (as described above), the boolean value may be examined to determine if further refinement should be performed.

A user may be permitted to specify the desired methodology for refining the location of a device 104. The different methodologies may include snapping the location to the closest point on the street network, a landmark, or a "point of interest" in the vicinity. Alternatively, the application may look for locations in the vicinity of the approximate location that the mobile device user has recently visited (i.e., studying the "history" in the user profile) and snapping the location to a particular location (e.g., the closest location last visited). Further, the application may examine "favorite" locations bookmarked by the mobile device user and determine if any such "favorite" locations are in the vicinity of the approximate device location. The approximate location may then snap to the closest "favorite" location.

To refine the approximate location of a device 104, a location refinement manager may be utilized. The location refinement manager is the initial point for location refinement, and a method of the location refinement manager may return a list of lists of refined locations. Each list of refined locations may be based on the particular refinement performed. For example, one list may be based on favorites, a second list may be based on the history, while a third list may be based on landmarks. Further, each list may be sorted based on their distance from the centroid or approximate location.

Once the list of lists of refined locations is obtained, all of the lists may be resolved into a single list. For example, each location in each list may be combined into a single list sorted by distance from the centroid. Additionally, the individual lists or single resolved lists may be filtered such that only locations within a specified polygon are returned. Further, based on the individual lists or single resolved list, a single refined list may be returned. Accordingly, depending on the implementation of the location refinement manager, the user may be presented with a single refined location, a list of refined locations, or a list of lists of refined locations. Nonetheless, the location refinement manager permits the approximate location of a device 104 to be refined based on various factors/heuristics that may be selectable by a user.

Adapter System Flow

Figure 4:
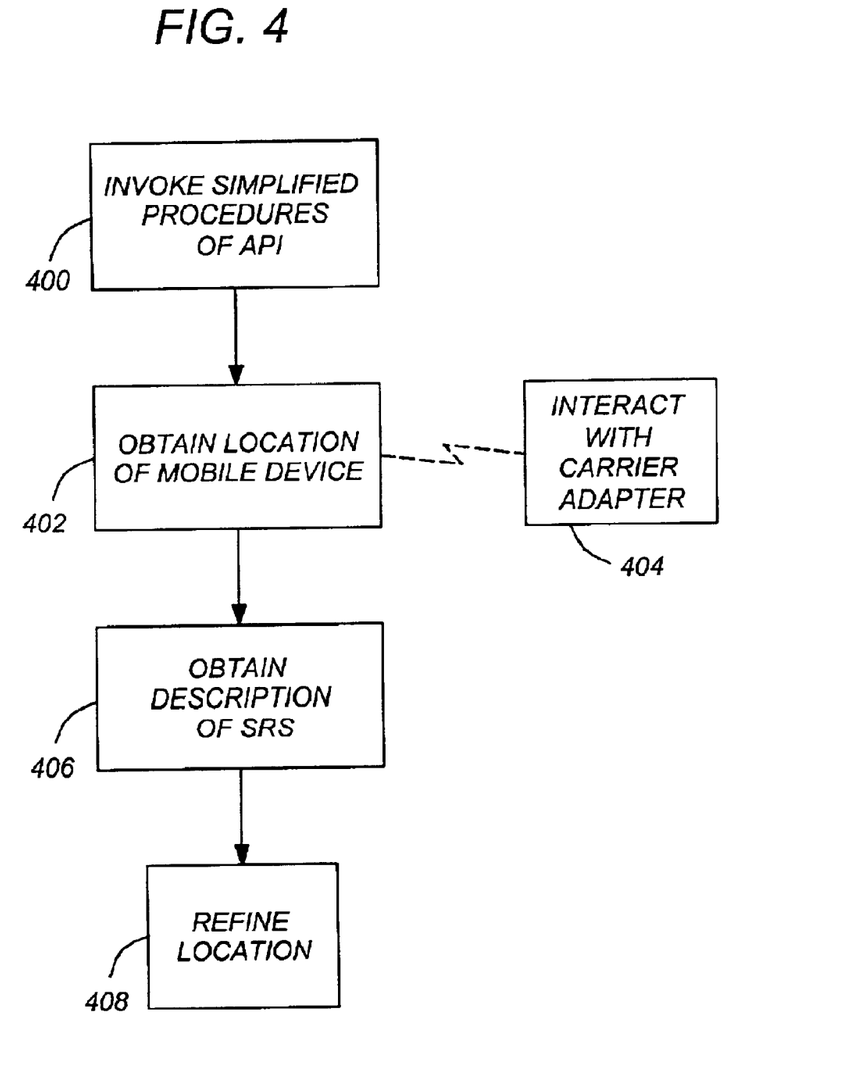
FIG. 4 is a flow chart that illustrates the use of an API in a mobile device locator adapter system in accordance with one or more embodiments of the invention.

FIG. 4 is a flow chart that illustrates the use of an API in a mobile device locator adapter system 100 in accordance with one or more embodiments of the invention. Referring to both FIG. 1 and FIG. 4, in the mobile device locator adapter system 100 an application program 110 (i.e., a device locator) may be dynamically deployed within a computer system 100 without deploying a new version of the computer system 100.

Once the application program 110 has been deployed, simplified procedures of an API 122 of the application program 110 may be invoked at step 400. The simplified procedures obtain the location of the mobile device 104 at step 402 (e.g., using an identification of the mobile device 104). To obtain the location, the invoked procedures interact with the carrier adapter 124 at step 404. Since the carrier adapter 124 is customized for a particular carrier 126, specific information and methods may be utilized. For example, the invoked procedures may interact with the specifics for a mobile positioning server of the carrier 126 and different methods of identifying the device 104 as required by the carrier 126. Additionally, the invoked procedures may obtain the spatial reference system associated with the location of the device 104 at step 406.

The location of the mobile device 104 obtained at step 402 may comprise a cellular phone number, an MSISND, an Internet protocol address encoded in a request header or a pre-stored default. Further as described above, by interacting with one or more carrier adapters 124 at step 404, the invoked procedures interact with different protocols provided by the carriers 126. Once the location has been obtained at step 406, the location may be further refined at step 408. To refine the location, one or more heuristics may be applied. For example, as described above, the location may be snapped to a closest point on a street network, to a landmark or point of interest in the vicinity, to a location in the vicinity of the location the mobile device user has recently visited (by examining the user's "history"), or to a location in a vicinity of the location that the mobile device user has bookmarked as a "favorite" location.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, or an type of mobile device such as a cellular phone, laptop computer, personal digital assistant, etc. could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for locating a mobile device, comprising an application programming interface (API), executed by a computer, for providing a plurality of simplified procedures that allow an application program executed by the computer to locate the mobile device, wherein:

(a) the application program invokes the simplified procedures of the API; and (b) the invoked procedures obtain:

(i) a location of the mobile device given an identification of the mobile device, wherein:

(1) the invoked procedures are configured to interact with specifics for two or more mobile positioning servers for carriers of two or more mobile devices; and (2) the invoked procedures interact with two or more different methods of identifying the mobile devices as required by the different carriers of the mobile devices, and wherein a new different method for identifying the mobile devices may be dynamically deployed and used by the invoked procedures without deploying a new API or new application program;

(ii) a description of a spatial reference system associated with the location.

2. The apparatus of claim 1 wherein the identification of the mobile device comprises a cellular phone number.

3. The apparatus of claim 1 wherein the identification of the mobile device comprises a mobile subscriber international subscriber dialing number (MSISDN).

4. The apparatus of claim 1 wherein the identification of the mobile device comprises an Internet protocol (IP) address encoded in a request header.

5. The apparatus of claim 1 wherein the identification of the mobile device comprises a pre-stored default.

6. The apparatus of claim 1 wherein the invoked procedures interact with different protocols.

7. The apparatus of claim 1 wherein the application program refines the location of the mobile device by applying a heuristic.

8. The apparatus of claim 7 wherein the location is refined by snapping to a closest point on a street network.

9. The apparatus of claim 7 wherein the location is refined by snapping to a landmark or a point of interest in the vicinity.

10. The apparatus of claim 7 wherein the location is refined by snapping to a location in a vicinity of the location that a mobile device user has recently visited.

11. The apparatus of claim 7 wherein the location is refined by snapping to a location in a vicinity of the location that a mobile device user has bookmarked as a "favorite" location.

12. A method for accessing a network provided location of a mobile device, comprising invoking one or more simplified procedures of an application programming interface (API) executed by a computer, wherein:

(a) the simplified procedures allow an application program executed by the computer to access the network provided location of tho mobile device; and (b) the simplified procedures of the API obtain:
 (i) a location of the mobile device given an identification of the mobile device, wherein:
  (1) the invoked procedures are configured to interact with specifics for a two or more mobile positioning servers for carriers of two or more mobile devices; and
  (2) the invoked procedures interact with two or more different methods of identifying the mobile device as required by the different carries of the mobile devices, and wherein a new different method for identifying the mobile devices may be dynamically deployed and used by the invoked procedures without deploying a new API or new application program:
 (ii) a description of a spatial reference system associated with the location.

13. The method of claim 12 wherein the identification of the mobile device comprises a cellular phone number.

14. The method of claim 12 wherein the identification of the mobile device comprises a mobile subscriber international subscriber dialing number (MSISDN).

15. The method of claim 12 wherein the identification of the mobile device comprises an Internet protocol (IP) address encoded in a request header.

16. The method of claim 12 wherein the identification of the mobile device comprises a pre-stored default.

17. The method of claim 12 wherein the invoked procedures interact with different protocols.

18. The method of claim 12 further comprising refining the location of the mobile device by applying a heuristic.

19. The method of claim 18 wherein the location is refined by snapping to a closest point on a street network.

20. The method of claim 18 wherein the location is refined by snapping to a landmark or a point of interest in the vicinity.

21. The method of claim 18 wherein the location is refined by snapping to a location in a vicinity of the location that a mobile device user has recently visited.

22. The method of claim 18 wherein the location is refined by snapping to a location in a vicinity of the location that a mobile device user has bookmarked as a "favorite" location.

23. An article of manufacture embodying an application programming interface (API) that is executed by a computer, wherein the API includes a plurality of simplified procedures that allow an application program executed by the client computer to access a network provided location of a mobile device, wherein:

(a) the application program invokes the simplified procedures of the API; and (b) the invoked procedures obtain:
 (i) a location of the mobile device given an identification of the mobile device, wherein:
  (1) the invoked procedures are configured to interact with specifics for two or more mobile positioning servers for different carriers of the mobile devices; and
  (2) the invoked procedures interact with two or more different methods of identifying the mobile devices as required by the different carries of the mobile devices, and wherein a new different method for identifying the mobile devices may be dynamically deployed and used by the invoked procedures without deploying a new API or new application program:
 (ii) a description of a spatial reference system associated with the location.

24. The article of manufacture of claim 23 wherein the identification of the mobile device comprises a cellular phone number.

25. The article of manufacture of claim 23 wherein the identification of the mobile device comprises a mobile subscriber international subscriber dialing number (MSISDN).

26. The article of manufacture of claim 23 wherein the identification of the mobile device comprises an Internet protocol (IP) address encoded in a request header.

27. The article of manufacture of claim 23 wherein the identification of the mobile device comprises a pre-stored default.

28. The article of manufacture of claim 23 wherein the invoked procedures interact with different protocols.

29. The article of manufacture of claim 23 wherein the application program refines the location of the mobile device by applying a heuristic.

30. The article of manufacture of claim 29 wherein the location is refined by snapping to a closest point on a street network.

31. The article of manufacture of claim 29 wherein the location is refined by snapping to a landmark or a point of interest in the vicinity.

32. The article of manufacture of claim 29 wherein the location is refined by snapping to a location in a vicinity of the location that a mobile device user has recently visited.

33. The article of manufacture of claim 29 wherein the location is refined by snapping to a location in a vicinity of the location that a mobile device user has bookmarked as a "favorite" location.

* * * * *